United States Patent
Stout et al.

(10) Patent No.: US 7,589,447 B2
(45) Date of Patent: Sep. 15, 2009

(54) HIGH SPEED AEROSPACE GENERATOR RESILIENT MOUNT

(75) Inventors: David E. Stout, Tucson, AZ (US); Balwinder S. Birdi, Tucson, AZ (US); Anna C. Gradillas, Tucson, AZ (US); Walter L. Meacham, Phoenix, AZ (US); Edward M. Down, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/566,881

(22) Filed: Dec. 5, 2006

(65) Prior Publication Data
US 2008/0129134 A1    Jun. 5, 2008

(51) Int. Cl.
*H02K 5/16* (2006.01)
*H02K 7/08* (2006.01)

(52) U.S. Cl. .......................... 310/90; 310/51; 384/119; 384/535

(58) Field of Classification Search .................... 310/90, 310/51; 384/119, 535
See application file for complete search history.

(56) References Cited

U.S. PATENT DOCUMENTS

| | | | | |
|---|---|---|---|---|
| 1,386,255 A | * | 8/1921 | Hindle et al. ............... | 384/535 |
| 3,097,895 A | * | 7/1963 | Matt ........................... | 384/535 |
| 3,503,121 A | * | 3/1970 | Howe, Jr. .................... | 29/527.2 |
| 3,557,421 A | * | 1/1971 | Howe, Jr. .................. | 29/898.07 |
| 3,679,279 A | * | 7/1972 | Van Dorn et al. ........... | 384/537 |
| 4,682,065 A | * | 7/1987 | English et al. ................ | 310/90 |
| 5,044,789 A | * | 9/1991 | Damon et al. ............... | 384/581 |
| 5,357,547 A |  | 10/1994 | Obermeyer et al. |  |
| 5,405,199 A | * | 4/1995 | Mabuchi et al. ............. | 384/204 |
| 5,505,587 A |  | 4/1996 | Ghetzler |  |
| 5,527,115 A | * | 6/1996 | Zepp et al. ................... | 384/537 |
| 5,564,903 A | * | 10/1996 | Eccles et al. ................. | 416/174 |
| 5,839,835 A | * | 11/1998 | Zernickel et al. ............ | 384/497 |
| 5,848,461 A | * | 12/1998 | York et al. .................... | 29/598 |
| 5,899,443 A |  | 5/1999 | Su |  |
| 6,695,294 B2 |  | 2/2004 | Miller et al. |  |
| 6,746,005 B1 |  | 6/2004 | Su et al. |  |
| 6,939,052 B1 | * | 9/2005 | Hull ........................... | 384/535 |
| 2004/0160138 A1 | * | 8/2004 | Kuroda et al. ................. | 310/90 |
| 2005/0121988 A1 | * | 6/2005 | Howe et al. ................... | 310/90 |
| 2005/0232525 A1 | * | 10/2005 | Faust et al. ................. | 384/535 |

* cited by examiner

*Primary Examiner*—Quyen Leung
*Assistant Examiner*—Alex W Mok
(74) *Attorney, Agent, or Firm*—Oral Caglar, Esq.

(57) ABSTRACT

Centering rings may be used to modify the combined resonance of a rotor and its support assembly to migrate the rotor critical speeds such that they can be engineered out of the rotor operating speed range. The centering rings of the present invention may be useful for any rotating electrical machinery, especially high speed aerospace applications, such as generators and starter-generators.

7 Claims, 4 Drawing Sheets

HIGH SPEED AEROSPACE GENERATOR RESILIENT MOUNT

BACKGROUND OF THE INVENTION

The present invention generally relates to a mount for high speed rotating machinery and more specifically, to a resilient mount that may migrate rotor critical speeds of high speed rotating electrical machinery out of the rotor operating speed range.

The future direction of aerospace quality electric power systems is towards higher power, higher speed, lighter weight, variable frequency electric generators and starter generators. Variable frequency generators rotate throughout a range of speeds within an operating speed range. For a high speed aerospace generator, the operating speed range may typically be from about 10,800 to about 24,000 revolutions per minute (rpm). Potentially large centrifugal forces can be imposed on the rotors of generators operating at such speeds. The generator rotors must be precisely balanced to avoid vibration which may lead to deviation of the rotor shaft axis from its intended axis of rotation. Practically achieving and maintaining this precision balance can be difficult due to variations in the manufacture and assembly process of generators.

The amplitudes of vibrations resulting from rotor out of balance can be significant if the rotor's rotational speed reaches its resonance speed, or a multiple of its resonance speed. Such speeds are generally referred to as 'critical speeds'. Rotor critical speed and machine response is a function of the rotor mass, the distribution of that mass, the flexibility of the shaft, the bearing support locations and the stiffness of the rotor, bearings, housing and interface between the housing and the bearings.

Typical aerospace generators and starter generators employ rolling element bearings which have very high stiffness which may allow very little rotor variations from the rotor's intended axis of rotation. These rolling element bearings, because they have very high stiffness, places the first critical speed slightly above the maximum operating speed. As the rotor approaches the critical speed, unbalance load increases significantly resulting in large bearing loads and vibration. If an unbalanced rotor is rotating for prolonged periods of time at one of its critical speeds, it may be damaged, even catastrophically. If one of the rotor critical speeds is below the operating range, unbalance loads will be low while passing through it. Once above the first critical speed, the rotor will rotating about its mass center, resulting in low bearing loads and vibration.

U.S. Pat. No. 5,357,547, issued to Obermeyer et al., describes vibration damping of a tubular member. The vibration damper uses an annular sleeve which is attachable to the inside surface of a guide thimble tube which is sized to surround the rotating instrumentation tube. Dimples are attached to the interior wall of the sleeve for radially supporting the instrumentation tube. The wall of the sleeve has a flexible spring member which is formed from the wall for biasing the instrumentation tube into abutment with the dimples. Flow-induced vibration of the instrumentation tube will cause it to move out of contact with the dimples and further engage the spring member, restraining further movement of the instrumentation tube. The Obermeyer vibration damping method may be useful for instrumentation tubes in nuclear power reactor pressure vessels, however, this method may not be particularly useful in aerospace applications, including damping vibration in high speed rotating electrical machinery.

As can be seen, there is a need for an improved resilient mount for rotating electrical machinery that may be easy to manufacture and that may impart the desired stiffness between a bearing and its housing to avoid rotor critical speeds.

SUMMARY OF THE INVENTION

In one aspect of the present invention, a high speed rotating electrical machinery comprises a rotor; a first bearing supporting the rotor; a housing supporting the first bearing; and a first centering ring positioned between the first bearing and the housing, wherein the first centering ring has a stiffness that migrates rotor critical speeds outside an operating speed range of the high speed generator.

In another aspect of the present invention, a centering ring comprises an annular band of material; a plurality of ID bumps equally spaced apart along an inside diameter of the annular band of material; and a plurality of OD bumps equally spaced apart along an outside diameter of the annular band of material.

In yet another aspect of the present invention, a centering ring comprises a flange on a first end of the centering ring, the flange attached to a housing of a rotating machine; a tube spring attached to the flange; and a plurality of slots cut in the tube spring.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides a centering ring for modifying the combined resonance of a rotor and its support assembly to migrate the rotor critical speeds such that they can be engineered out of the rotor operating speed range. The centering rings of the present invention may be useful for any rotating electrical machinery, especially in high speed aerospace applications, such as generators and starter-generators.

Conventional rotor supports consistent of mounting the rotor on bearings, which have high stiffness, can result in high bearing loads and vibration at high speeds. Moreover, those conventional rotor supports having more simple designs, such as dimples about an annular sleeve, may not be useful in high speed rotating electrical machinery. The centering rings used in the present invention may use designs, such as alternating OD bumps and ID bumps along an annular band to migrate rotor critical speeds outside of the rotor operating speed range. Furthermore, unlike conventional systems, there is no need for complex designs to effectively migrate the rotor speed out of the rotor operating speed range because the present invention uses centering rings to effectively migrate the rotor speed out of the rotor operating speed range without a complex design.

As used herein, the term "stiffness" may refer to the resiliency of an object to deformation. For example, a centering ring may have a given stiffness to being deformed radially by a shaft inserted therein. Stiffness may be measured in thousands of pounds per inch (klb/in) which refers to the amount of force needed to deflect the object (centering ring, for example) one inch. The stiffness of the centering ring may be non-isotropic.

Figure 1:
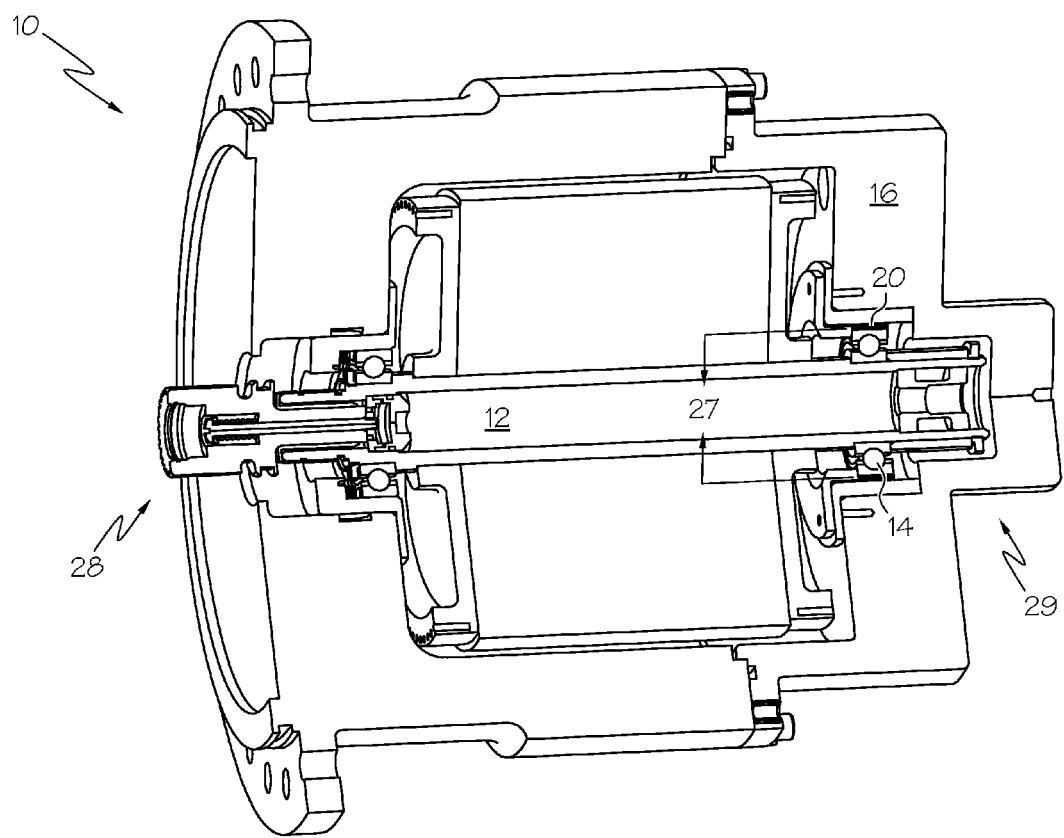
FIG. 1 is a cross-sectional view of a generator incorporating a centering ring according to one embodiment of the present invention.

Referring to FIG. 1, there is shown a cross-sectional view of a conventional generator 10 having a centering ring 20 according to an embodiment of the present invention. The centering ring 20 may be installed on a drive end (DE) 28 or on an opposite drive end (ODE) 29. Generator 10 may include a rotating shaft 12 supported by a bearing 14. The centering ring 20 may be disposed between the bearing 14, having an outside diameter 27, and a housing 16.

Figure 2:
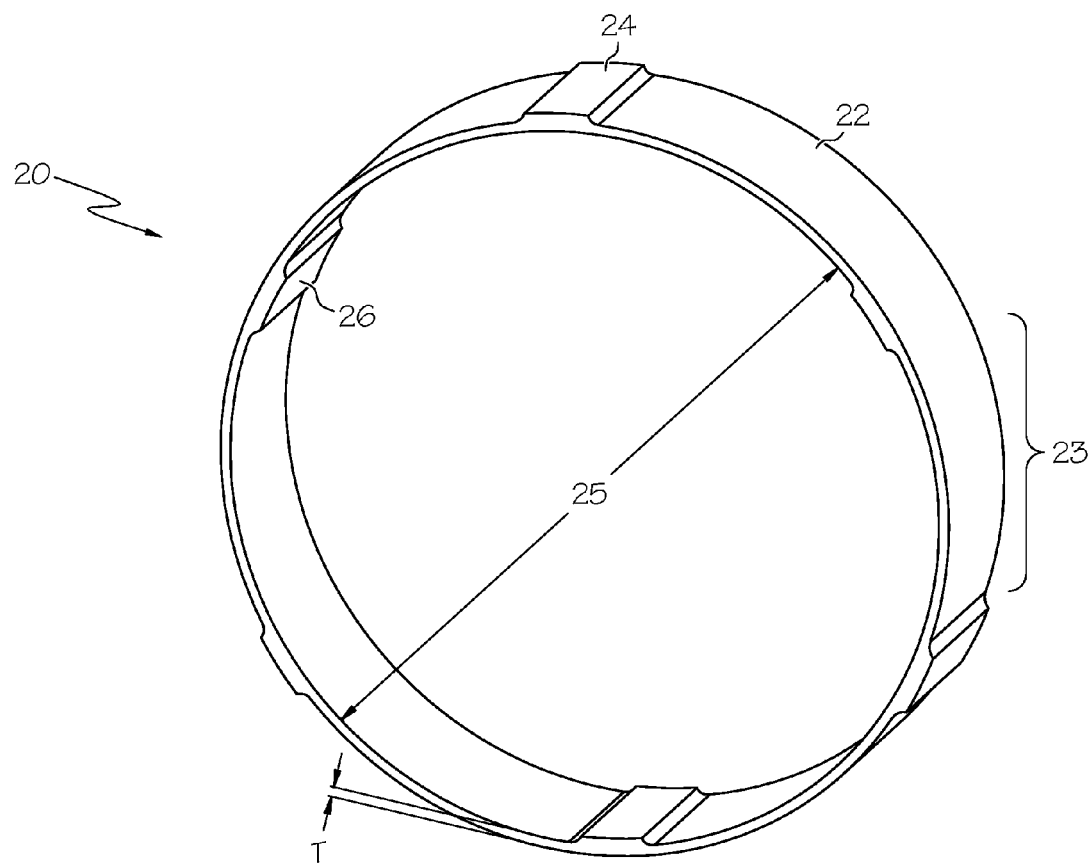
FIG. 2 is a perspective view of the centering ring of FIG. 1.

Referring now to FIG. 2, there is shown a perspective view of a centering ring 20 according to one embodiment of the present invention. The centering ring 20 may include a band 22 of material with a number of equally spaced support bumps along an outside diameter (OD) of the band 22, also referred to as OD bumps 24. In between the OD bumps 24 may be disposed an equal number of bumps along an inside diameter (ID) of the band 22, also referred to as ID bumps 26. By placing the centering ring 20 into position around the outside diameter of the bearing 14, the OD bumps 24 and ID bumps 26 may act as lands which may contact the outside diameter 27 of the bearing 14 and the inside diameter of the housing 16 (see FIG. 1). Under bearing load, the band 22 of material between the OD bumps 24 and ID bumps 26 may deflect due to the vibration of the shaft 12 within the bearing 14. The presence of the centering ring 20 between the bearing 14 and the housing 16 may provide a resilient stiffness to migrate the critical speed of the shaft 12 outside of the operating speed range of the generator 10.

The band 22 may have an inside diameter 25 essentially the same as the outside diameter 27 of the bearing 14 (see FIG. 1). In other words, the band 22 should fit around the bearing 14 with the ID bumps 26 of the bearing 14 engaging the outside diameter 27 of the bearing 14. The band 22 may be made of any material such as metal, composite and the like. Suitable metals may include titanium or a metal alloy such as Inconel™. The band 22 may have a thickness T adequate to provide resilience to vibration in order to migrate the critical speeds of the shaft 12 (see FIG. 1) outside of the shaft operating speed range. The number of bumps 24, 26 and a spacing 23 therebetween may be determined based on the critical speeds of the system and the stiffness needed to migrate the rotor critical speeds outside of the rotor operating speed range. For example, by increasing the number of bumps 24, 26 (in other words, by decreasing the spacing 23 therebetween), the stiffness of the centering ring 20 may increase, thereby absorbing less vibrations of the shaft 12. For example, the centering ring 20 may be designed to have an overall stiffness between about 5 klb/in and about 1000 klb/in. The stiffness of the centering spring will depend on the stiffness required to maintain critical speeds below and above the operating speed range. Too low of stiffness might place a critical speed significantly below the minimum operating speed, however, this could results in a critical speed close to the maximum operating speed. In some cases, centering springs of different stiffness might need to be incorporated at each bearing to maintain critical speed margin with respect to the minimum operating speed and the maximum operating speed.

Figure 3:
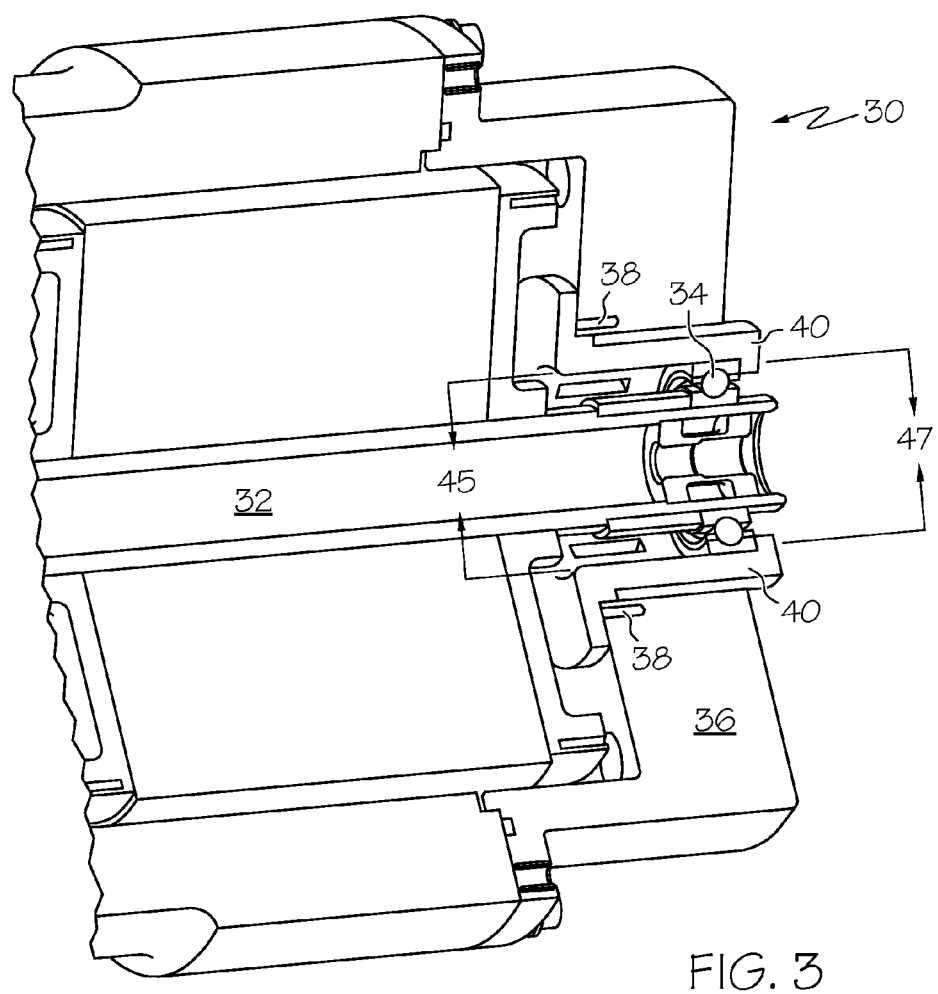
FIG. 3 is a cross-sectional view of a generator incorporating a centering ring according to another embodiment of the present invention.

Referring to FIG. 3, there is shown a cross-sectional view of a generator 30 having a centering ring 40 according to an embodiment of the present invention. Generator 30 may include a rotating shaft 32 supported by a bearing 34. The centering ring 40 may be attached, for example, by bolts 38 to a housing 36. The centering ring 40 may have an inside diameter 45 that may fit about an outside diameter 47 of the bearing 34.

Figure 4:
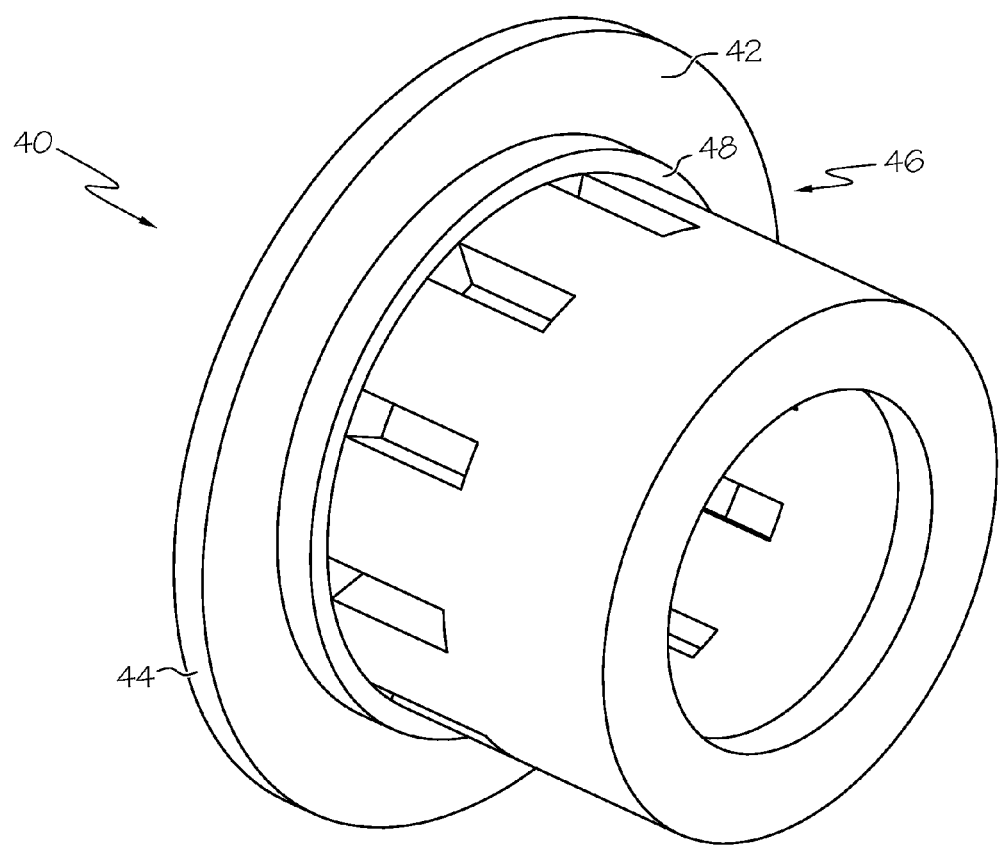
FIG. 4 is a perspective view of the centering ring of FIG. 3.

Referring now to FIG. 4, there is shown a perspective view of a centering ring 40 according to one embodiment of the present invention. The centering ring 40 may be a tube spring 46 having a flange 42 formed on a first end 44. The tube spring 46 may be attached to the flange 42 by conventional means, such as welding, or may be formed integrally with the flange 42 during manufacture. The flange 42 may be attached, by bolts (not shown) for example, to the housing 36. The tube spring 46 of the centering ring 40 may be installed about the bearing 34. The bearing 34 may be cantilevered from the housing 36 in the centering ring 40. Under bearing load, the centering ring 40 may deflect due to the vibration of the shaft 32 within the bearing 34. The presence of the centering ring 40 between the bearing 34 and the housing 36 may provide a resilient stiffness to migrate the critical speed of the shaft 32 outside of the operating speed range of the generator 30. The centering ring may include a plurality of slots 48 cut along an axial direction of the centering ring 40 as shown in FIG. 4. The number and size of the slots 48 may be determined based on the critical speeds of the system and the stiffness needed to migrate the rotor critical speeds outside of the rotor operating speed range. For example, by decreasing the number of slots 48, the stiffness of the centering ring 40 may increase, thereby absorbing less vibrations of the shaft 32. The centering ring 40 may be designed to have an overall stiffness between about 5 klb/in and about 1000 klb/in. Similar to the centering ring 20 described above, a centering ring 40 having a greater relative stiffness may migrate the rotor critical speeds to a lesser extent as compared to a centering ring 40 having a lower relative stiffness. The centering ring 40 may be mounted on either the drive end (DE) or on the opposite drive end (ODE) of the generator 30 shown in FIG. 3.

The centering ring 40 may have an inside diameter 45 essentially the same as the outside diameter 47 of the bearing 34. The centering ring 40 may be made of any material such as metal, composite and the like. Suitable metals may include titanium or a metal alloy such as Inconel™.

Either of the centering rings 20, 40 may be used to modify the combined resonance of the rotor 12, 32 and support assembly (housing 16, 36). This may be achieved in any number of ways. For example, the first rotor critical speed may be migrated such that the operating speed range of the rotor falls below this first critical speed. Alternatively, the rotor critical speeds may be migrated such that the first rotor critical speed is below the operating speed range of the rotor and a second rotor critical speed is above the operating speed range of the rotor. As discussed above, rotor critical speeds may be migrated by adjusting the resilience of the centering ring 20, 40 according to the present invention.

It should be understood, of course, that the foregoing relates to preferred embodiments of the invention and that modifications may be made without departing from the spirit and scope of the invention as set forth in the following claims.

We claim:

1. A high speed rotating electrical machinery, comprising:
    a rotor;
    a first bearing supporting the rotor;
    a housing supporting the first bearing; and
    a first centering ring positioned between the first bearing and the housing that deflects due to the vibration of the rotor, wherein the first centering ring comprises:
        a flange in the shape of a cylindrical disk, with the flange having a uniform thickness and integral with a first end of the first centering ring and the flange attached to the housing;
        a tube spring having a cylindrical shape and a uniform thickness, with the tube spring attached to the flange; and
        a plurality of slots forming radial openings through the tube spring, the slots being sealed at a first end by the flange and the slots, at the second opposite end, being sealed by virtue of continuing only partially in an axial direction through the tube spring; whereby
    the number and size of the slots are selected such that the first centering ring exhibits a radial stiffness that will migrate rotor critical speeds outside of an operating speed range of the high speed rotating electrical machinery by selectively absorbing more or less vibrations of the rotor according to the radial stiffness of the centering ring.

2. The high speed rotating electrical machinery according to claim 1, wherein the flange is attached to the housing with bolts.

3. The high speed rotating electrical machinery according to claim 1, wherein the first centering ring is located at one of a drive end or an opposite drive end of the rotor.

4. The high speed rotating electrical machinery according to claim 1, further comprising:
    a second bearing supporting the rotor; and
    a second centering ring positioned between the second bearing and the housing.

5. The high speed rotating electrical machinery according to claim 1, wherein the centering ring has a stiffness between about 5 klb/in and about 1000 klb/in.

6. The high speed rotating electrical machinery according to claim 1, wherein the rotating electrical machinery is one of a generator or a starter-generator.

7. The high speed rotating electrical machinery according to claim 1, wherein the centering ring has non-isotropic stiffness.

* * * * *